(12) United States Patent
Bi et al.

(10) Patent No.: US 8,599,783 B2
(45) Date of Patent: Dec. 3, 2013

(54) METHOD AND SYSTEM FOR TRANSMITTING RELAY LINK CONTROL CHANNEL

(75) Inventors: Feng Bi, Shenzhen (CN); Ming Yuan, Shenzhen (CN); Feng Liang, Shenzhen (CN); Jin Yang, Shenzhen (CN); Shuanshuan Wu, Shenzhen (CN); Jing Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 109 days.

(21) Appl. No.: 13/203,462

(22) PCT Filed: Mar. 12, 2010

(86) PCT No.: PCT/CN2010/071027
§ 371 (c)(1),
(2), (4) Date: Aug. 25, 2011

(87) PCT Pub. No.: WO2010/105536
PCT Pub. Date: Sep. 23, 2010

(65) Prior Publication Data
US 2012/0063384 A1   Mar. 15, 2012

(30) Foreign Application Priority Data

Mar. 18, 2009  (CN) .......................... 2009 1 0080085

(51) Int. Cl.
H04W 4/00 (2009.01)

(52) U.S. Cl.
USPC .......................................... 370/329; 370/315

(58) Field of Classification Search
None
See application file for complete search history.

(56) References Cited

U.S. PATENT DOCUMENTS 5,784,365 A    7/1998  Ikeda
2009/0252079 A1*  10/2009  Zhang et al. ................. 370/315

(Continued)

FOREIGN PATENT DOCUMENTS

CN    1143870 A    2/1997
CN    101527916 A   9/2009

(Continued)

OTHER PUBLICATIONS

"Relay Link Control Signalling", 3GPP Draft; R1-091151, 3rd Generation Partnership Project (3GPP), Mobile Competence Centre; 650, Route Des Lucioles ; F-06921 Sophia-Antipolis Cedex; France, no. Seoul, Korea; 20090317, Mar. 17, 2009, XP050338775, pp. 1-5.

(Continued)

*Primary Examiner* — Robert Wilson
(74) *Attorney, Agent, or Firm* — Oppedahl Patent Law Firm LLC

(57) ABSTRACT

A method and system for transmitting a relay link control channel are disclosed for realizing the mapping and transmission of a control channel on a link from an eNode-B to a relay node. In the present invention, in a frequency division multiplex mode, control information is carried by one or more resource blocks in the frequency direction and the universal set of OFDM symbols available to a relay link in a subframe in the time direction; in a time division and frequency division multiplex mode, control information is carried by one or more resource blocks in the frequency direction and a subset of OFDM symbols available to a relay link in a subframe in the time direction; in a time division multiplex mode, control information is carried by all the resource blocks in the frequency direction and a subset of OFDM symbols available to a relay link in a subframe in the time direction; and the mapping of the control channel includes mapping in the time direction and/or the frequency direction. The present invention has backward compatibility and can obtain frequency diversity again. The time division multiplex mode can save power consumption, and the frequency division multiplex mode and the time division and frequency division multiplex mode have the advantages of flexible service scheduling.

21 Claims, 7 Drawing Sheets

(56) References Cited

U.S. PATENT DOCUMENTS

| | | | |
|---|---|---|---|
| 2012/0014349 A1* | 1/2012 | Chung et al. | 370/329 |
| 2012/0026934 A1* | 2/2012 | Park et al. | 370/315 |
| 2012/0026935 A1* | 2/2012 | Park et al. | 370/315 |
| 2012/0063384 A1* | 3/2012 | Bi et al. | 370/315 |
| 2012/0099518 A1* | 4/2012 | Park et al. | 370/315 |
| 2012/0269113 A1* | 10/2012 | Park et al. | 370/315 |
| 2012/0287900 A1* | 11/2012 | Seo et al. | 370/329 |

FOREIGN PATENT DOCUMENTS

| | | |
|---|---|---|
| RU | 2189117 C2 | 9/2002 |
| RU | 2210189 C2 | 8/2003 |
| WO | 2007147231 A1 | 12/2007 |

OTHER PUBLICATIONS

"Control Channel and Data Channel Design for Relay Link in LTE-Advanced", TSG-RAN Working Group 1 Meeting, 3GPP, TSG RAN WG1 #55BIS, R1-090153; Ljubljana, Slovenia, vol. 3GPP TSG RAN WG1 #55BIS, R1-090153; Jan. 8, 2009, pp. 1-17, XP008149263, pp. 1-17.

Supplementary European Search Report in European application number 10753103.0, mailed on Mar. 14, 2013, pp. 1-44.

International Search Report on international application No. PCT/CN2010/071027, mailed on Jun. 10, 2010.

English Translation of the Written Opinion of the International Search Authority in international application No. PCT/CN2010/071027, mailed on Jun. 10, 2010.

Resource Allocation for Multiuser Cooperative OFDM Networks 2005, pp. 1-15.

"Control Channel Structure and Mapping Pattern of Backhaul Link", 3GPP DRAFT; R1-091424 Control Channel Atructure and Mapping Pattern of Backhaul Link, 3rd Generation Partnership Project (3GPP), Mobile Competence Centre; 650, Route des Lucioles ; F-06921 Sophia-Antipolis Cedex; France, No. Seoul, Korea; Mar. 17, 2009, XP050339004, pp. 1-7.

"Consideration on Resource Allocation for Relay Backhaul Link", 3GPP DRAFT; R1-090790, 3rd Generation Partnership Project (3GPP), Mobile Competence Centre; 650, Route des Lucioles ; F-06921 Sophia-Antipolis Cedex; France, No. Athens, Greece; Feb. 3, 2009, XP050318647, pp. 1-5.

"Relay Link Control Signalling", 3GPP DRAFT; R1-091151, 3rd Generation Partnership Project (3GPP), Mobile Competence Centre; 650, Route des Lucioles ; F-06921 Sophia-Antipolis Cedex; France, no. Seoul, Korea; 20090317, Mar. 17, 2009, 20090317, XP050338775, pp. 1-5.

"Control Channel and Data Channel Design for Relay Link in LTE-Advanced", TSG-RAN Working Group 1 Meeting, 3GPP, TSG RAN WG1 #55BIS, R1-090153; Ljubljana, Slovenia, vol. 3GPP TSG RAN WG1 #55BIS, R1-090153; Jan. 8, 2009, pp. 1-17, XP008149263, pp. 17.

Supplementary European Search Report in European application number: 10753103.0, mailed on Mar. 14, 2013, pp. 1-44.

3GPP TSG RAN WG1#56 Athens, Greece, Feb. 9-13, 2009 R1-090591, pp. 1-8.

3GPP TSG RAN WG1 Meeting#55bis Ljubljana, Slovenia, Jan. 12-16, 2009 R1-090222, pp. 1-5.

TSG-RAN WG1 #56 Athens, Greece, Feb. 9-13, 2009 R1-090641, pp. 1-3.

* cited by examiner

METHOD AND SYSTEM FOR TRANSMITTING RELAY LINK CONTROL CHANNEL

TECHNICAL FIELD

The present invention relates to a relay transmission technology, and particularly to a method and system for transmitting a downlink relay link control channel in a 3GPP Long Term Evolution (LTE) system or 3GPP Long Term Evolution Advanced (LTE-A) system.

BACKGROUND

In an Orthogonal Frequency Division Multiplexing (OFDM) system, data are time-frequency dimensional, therefore, multiplexing carried out between a control channel and a service channel can be in the time direction and the frequency direction, that is, there are two multiplexing modes available: Time Division Multiplex (TDM) and Frequency Division Multiplex (FDM). In an LTE or LTE-A system, a Resource Block (RB; an RB mapped to a physical resource is known as a physical resource block) is defined as OFDM symbols in a continuous slot in time domain and 12 or 24 continuous subcarriers in frequency domain, therefore, one RB consists of $N_{symb}*N_{SC}^{RB}$ Resource Elements (REs), wherein $N_{symb}$ represents the number of the OFDM symbols in one slot, and $N_{SC}^{RB}$ represents the number of the continuous subcarriers of an RB in the frequency domain.

An LTE system, an LTE-A system and an International Mobile Telecommunication Advanced (IMT-Advanced) system are all based on an OFDM technology, and data are time-frequency dimensional in an OFDM system, however, in order to lower the power consumption of a UE, the control channel generally adopts TDM mode, in other words, the control channel and the service channel are separated in time from each other, for instance, if there are 14 OFDM symbols in a subframe and the first one, two, three or four OFDM symbol(s) can be taken as a control channel, then the following 13, 12, 11 or 10 OFDM symbols can be correspondingly taken as a service channel.

An explanation is given below firstly by taking a control channel of a current LTE system as an example, for instance, in an LTE system, downlink control signaling mainly includes the following contents:

1) a Physical Control Format Indicator Channel (PC-FICH);
2) DownLink Grant (DL grant);
3) UpLink Grant (UL grant);
4) a Physical Hybrid Automatic Repeat Request Indicator Channel (PHICH);

it can be seen that a control channel is composed of different parts, each of which has a specific function. For the sake of a convenient description, the following terms and conventions are defined:

1) several OFDM symbols are indicated to serve as a control channel (namely, a PCFICH), independent from Control Channels Elements (CCE), wherein the PHICH is also independent from the CCE;
2) L continuous subcarriers in the frequency domain are referred to as the CCE, which may include the DL grant and the UL grant;
3) each CCE is modulated through Quadrature Phase Shift Keying (QPSK) modulation;
4) each control channel consists of one CCE or multiple CCEs;
5) each UE can monitor a series of candidate control channels;
6) the number of candidate control channels is the maximum time of blind detections;
7) the number of candidate control channels is greater than that of the CCEs;
8) several combinations are specified for a receiving end and a transmitting end, for instance, only the combinations of 1, 2, 4 or 8 CCE(s) are taken as the candidate control channel;
9) the combinations of 1, 2, 4 or 8 CCE(s) may correspond to different code rates, respectively.

At an eNode-B, control information of each UE is subjected to channel coding and then sequentially to QPSK modulation, to mapping from a CCE to an RE and to Inverse Fast Fourier Transform (IFFT), and then it is sent out; provided that the control channel here consists of 32 CCEs, after the receiving end completes Fast Fourier Transform (FFT), the UE starts to carry out a blind detection starting from the combination of 1 CCE (that is, respectively carrying out a blind detection on CCE0, CCE1, . . . CCE31), or starting from the combination of 2 CCEs (that is, respectively carrying out a blind detection on [CCE0, CCE1], [CCE2, CCE3], . . . [CCE30, CCE31]) if the monitoring on a UE_ID is failed, and so forth. The UE is switched to a sleep mode if it monitors no UE_ID matching with itself during the whole blind detection process, which means no distribution of control signaling to the UE at this time, or the UE demodulates corresponding service information according to control signaling if it monitors a matched UE_ID.

The research object of B3G/4G is to provide a user with wireless transmission with a peak rate as high as 100 MPs and 1 Gbps respectively in a high-speed and low-speed mobile environment by pooling a cellular access system, a fixed wireless access system, a nomadic access system and a wireless area network and other access systems in combination with an all-IP network, and to realize seamless connection of a cellular system, a local wireless network, broadcast and television and satellite communications so that people can communicate with any other one in any way at any place and at any time. A relay technology, which can be applied as an effective measure, can improve both the coverage and the capacity of a cell.

An inband-relay means that a link from an eNode-B to a relay node and a link from the relay node to a User Equipment (UE) are operative on the same frequency resource. However, since a transmitter of an inband-relay node will cause interference (self-interference) on a receiver of the inband-relay node, it is impossible that the link from the eNode-B to the relay node and the link from the relay node to the UE are operative synchronously on the same frequency resource unless signal separation and antenna isolation are great enough. Similarly, the relay node cannot send the eNode-B data while receiving data from the UE.

In accordance with the regulations in a current LTE system, a 10 ms radio frame consists of 10 subframes of length 1 ms, which may comprise unicast subframes and multicast broadcast subframes, wherein if Frequency Division Duplex (FDD) mode is adopted, subframes #0 and #5 are used for sending synchronous signals, and subframes #4 and #9 are used for paging; and if Time Division Duplex (TDD) mode is adopted, subframes #0 and #5 are used for sending synchronous signals, and subframes #1 and #6 are used for paging, that is, FDD subframes (#0, #4, #5 and #9) and TDD subframes {#0, #1, #5 and #6} are dedicatedly used for the aforementioned specific purposes, therefore they cannot be used for distribution of subframes in a Multicast Broadcast Single Frequency Network (MBSFN), in other words, there are at most 6 distributable MBSFN subframes in a radio frame.

A possible solution to the receiving-sending interference problem is to forbid a relay node sending data to a UE while the relay node is receiving data from an eNode-B, that is, to add, after relaying to a UE link, a guard gap which is only for a conversion from a receiving state to a sending state or an inverse conversion but not for any other operation. MBSFN subframes are currently adopted in an LTE to transmit relay subframes in the following specific way: a Multimedia Broadcast Multicast Service (MBMS) Control Entity (MCE) first configures available MBSFN subframes for an eNode-B, then the eNode-B configures available relay subframes in the available MBSFN subframes. Therefore, on downlink, a relay node first sends its subordinate UE control information (including feedback information Acknowledgment/Negative Acknowledgement (ACK/NACK) of uplink transmission data and UL grant information)) at the first 1 or 2 OFDM symbol(s), then completes switching from a sending state to a receiving state in the time range 'gap', and at last receives data from the eNode-B at the following OFDM symbols.

Currently, the research on using an MBSFN subframe as a relay subframe has been a hot object, while the research on a specific control channel structure and a mapping manner of a link from an eNode-B to a relay node (RN) is still blank. In addition, on downlink, an RN first sends control information to its subordinate UE at the first 1 or 2 OFDM symbol(s) while an eNode-B sends control information to a directly-connected UE at the first 1, 2, 3 or 4 OFDM symbol(s), therefore, the RN cannot receive the control information of the link from the eNode-B to the RN at the first 1 or 2 OFDM symbol(s). The present invention is just proposed to address such problems.

SUMMARY

On that account, it is a main objective of the present invention to provide a method for transmitting a relay link control channel to realize the mapping and transmission of a control channel on a link from an eNode-B to a relay node. In order to achieve this objective, the following technical solution is adopted in the present invention.

A method for mapping a control channel of a relay link, said method comprising: mapping, by an eNode-B, a control channel of a relay link based on an availability of a Frequency Division Multiplex (FDM) mode, a Time Division and Frequency Division Multiplex (TDM-FDM) mode, or a Time Division Multiplex (TDM) mode; and transmitting, by the eNode-B, the control channel over the relay link between the eNode-B and a relay node wherein when the FDM mode is available, the control information of the relay link from the eNode-B to the relay node may be carried by one or more resource blocks in a frequency direction and a universal set of Orthogonal Frequency Division Multiplexing (OFDM) symbols in the subframe available to the relay link in a time direction;

when the TDM-FDM mode is available, the control information of the relay link from the eNode-B to the relay node may be carried by one or more resource blocks in the frequency direction and a subset of OFDM symbols in the subframe available to the relay link in the time direction;

when the TDM mode is available, the control information of the relay link from the eNode-B to the relay node may be carried by all the resource blocks in the frequency direction and a subset of OFDM symbols in the subframe available to the relay link in the time direction; and the mapping of the control channel may comprise mapping in the time direction and/or the frequency direction.

Further, when the FDM mode is available, the control information of the relay link from the eNode-B to the relay node is carried by continuous or discrete resource blocks and the universal set of OFDM symbols in the subframe available to the relay link.

In the FDM mode, the mapping of the control channel in the frequency direction may be as follows:

the control information of the relay link from the eNode-B to the relay node is carried in a control information carrying manner corresponding to continuous resource blocks and the universal set of OFDM symbols in the subframe available to the relay link; in this carrying manner, the eNode-B and the relay node determine quantity and positions of resource blocks used for carrying the control information of the relay link from the eNode-B to the relay node according to a cell ID in the system and the total quantity of the resource blocks or according to the cell ID in the system and a subframe number, and the control information and information on quantity and positions of other resource blocks for carrying the control information of the relay link from the eNode-B to the relay node is carried by one or more of the determined resource blocks used for carrying the control information of the relay link from the eNode-B to the relay node;

or the control information of the relay link from the eNode-B to the relay node is carried in a control information carrying manner corresponding to discrete resource blocks and the universal set of OFDM symbols in the subframe available to the relay link; in this carrying manner, the eNode-B and the relay node determine quantity and positions of resource blocks used for carrying the control information of the relay link from the eNode-B to the relay node according to the cell ID in the system and the total quantity of the resource blocks or according to the cell ID in the system and a subframe number, and the control information and information on quantity and positions of other resource blocks for carrying the control information of the relay link from the eNode-B to the relay node is carried by ones corresponding to a subcarrier group mapped by a physical control format indicator channel (PCFICH) in the determined resource blocks used for carrying the control information of the relay link from the eNode-B to the relay node.

Further, when the TDM-FDM mode is available, the control information of the relay link from the eNode-B to the relay node is carried by continuous or discrete resource blocks and a subset of OFDM symbols in the subframe available to the relay link.

In the TDM-FDM mode, the mapping of the control channel in the frequency direction may be as follows:

the control information of the relay link from the eNode-B to the relay node is carried in a control information carrying manner corresponding to continuous resource blocks and a subset of OFDM symbols in the subframe available to the relay link; in this carrying manner, the eNode-B and the relay node determine quantity and positions of resource blocks used for carrying the control information of the relay link from the eNode-B to the relay node according to a cell ID in the system and the total quantity of the resource blocks or according to the cell ID in the system and a subframe number, and the control information and information on quantity and positions of other resource blocks for carrying the control information of the relay link from the eNode-B to the relay node is carried by one or more of the determined resource blocks used for carrying the control information of the link from the eNode-B to the relay node;

or the control information of the relay link from the eNode-B to the relay node is carried in a control information carrying manner corresponding to discrete resource blocks and a subset of OFDM symbols in the subframe available to the relay link; in this carrying manner, the eNode-B and the relay node determine quantity and positions of resource blocks used for carrying the control information of the relay link from the eNode-B to the relay node according to the cell ID in the system and the total quantity of the resource blocks or according to the cell ID in the system and a subframe number, and the control information and information on quantity and positions of other resource blocks for carrying the control information of the relay link from the eNode-B to the relay node is carried by ones corresponding to a subcarrier group mapped by a physical control format indicator channel (PCFICH) in the determined resource blocks used for carrying the control information of the relay link from the eNode-B to the relay node.

Further, when the TDM mode is available, the control information of the relay link from the eNode-B to the relay node is carried by all the resource blocks in the frequency direction and a subset of OFDM symbols in the subframe available to the relay link in the time direction.

In the TDM-FDM mode or TDM mode, there may be at least one OFDM symbol and at most four OFDM symbols for carrying the control information of the relay link from the eNode-B to the relay node.

Further, in the time direction, the eNode-B may send the control information of the relay link from the eNode-B to the relay node starting from the fourth or the fifth OFDM symbol; if the number of downlink resource blocks is less than or equal to 10, starting from the fifth OFDM symbol, otherwise, starting from the fourth OFDM symbol;

the relay node may receive the control information of the relay ink from the eNode-B to the relay node starting from the fourth or fifth OFDM symbol; if the number of downlink resource blocks is less than or equal to 10, starting from the fifth OFDM symbol, otherwise, starting from the fourth OFDM symbol;

or in the time direction, the eNode-B may send the control information of the relay link from the eNode-B to the relay node always starting from the fourth or the fifth OFDM symbol, and the relay node may receive the control information of the relay link from the eNode-B to the relay node always starting from the fourth or the fifth OFDM symbol;

or in the time direction, the starting position of OFDM symbols where the eNode-B sends the control information of the relay link from the eNode-B to the relay node may be configured in a signaling notification manner, and the starting position of OFDM symbols where the relay node begins to receive the control information of the relay link from the eNode-B to the relay node may be acquired according to signaling configuration.

Further, the control information of the relay link from the eNode-B to the relay node may comprise control information of one or more relay nodes; the control information also may comprise: control information of relay node DL grant and UL grant, and/or control information of resources available to the relay node informed by the eNode-B, and/or control information of a UE to which the relay node belongs informed by the eNode-B.

Another main objective of the present invention is to provide a system for mapping a control channel of a relay link, the system comprising an eNode-B and a relay node, wherein the eNode-B comprises a control channel mapping module implemented by a processor with software running thereon, and the relay node comprises a control channel de-mapping module implemented by another processor with software running thereon:

the control channel mapping module is configured to map control channel of based on an availability a Frequency Division Multiplex (FDM) mode, a Time Division and Frequency Division Multiplex (TDM-FDM) mode, or a Time Division Multiplex (TDM) mode, and transmit the control channel to a control channel de-mapping module; and when the FDM mode is available, the control information of the relay link from the eNode-B to the relay node may be carried by one or more resource blocks in the frequency direction and a universal set of OFDM symbols in a subframe available to the relay link in a time direction;

when the TDM-FDM mode is available, the control information of the relay link from the eNode-B to the relay node may be carried by one or more resource blocks in the frequency direction and a subset of OFDM symbols in a subframe available to the relay link in the time direction;

when the TDM mode is available, the control information of the relay link from the eNode-B to the relay node may be carried by all the resource blocks in the frequency direction and a subset of OFDM symbols in a subframe available to the relay link in the time direction; and the control channel de-mapping module is configured to receive and de-map the control channel to acquire the control information; and the mapping of the control channel may comprise mapping in the time direction and/or the frequency direction.

In the system, when the FDM mode is available, the control information of the relay link from the eNode-B to the relay node is carried by continuous or discrete resource blocks and the universal set of OFDM symbols in the subframe available to the relay link.

Further, there may be at least one OFDM symbol and at most four OFDM symbols for carrying the control information of the relay link from the eNode-B to the relay node.

Further, in the time direction, the eNode-B may send the control information of the relay link from the eNode-B to the relay node starting from the fourth or the fifth OFDM symbol; if the number of downlink resource blocks is less than or equal to 10, starting from the fifth OFDM symbol, otherwise, starting from the fourth OFDM symbol;

the relay node may receive the control information of the relay link from the eNode-B to the relay node starting from the fourth or fifth OFDM symbol; if the number of downlink resource blocks is less than or equal to 10, starting from the fifth OFDM symbol, otherwise, starting from the fourth OFDM symbol;

or in the time direction, the eNode-B may send the control information of the relay link from the eNode-B to the relay node always starting from the fourth or the fifth OFDM symbol, and the relay node may receive the control information of the relay link from the eNode-B to the relay node always starting from the fourth or the fifth OFDM symbol;

or in the time direction, the starting position of OFDM symbols where the eNode-B sends the control information of the relay link from the eNode-B to the relay node may be configured in a signaling notification manner, and the starting position of OFDM symbols where the relay node begins to receive the control information of the relay link from the eNode-B to the relay node may be acquired according to signaling configuration.

In the present invention, the structure and the mapping manner of a relay link control channel are suitably applicable to a link from an eNode-B to a relay node, which guarantees the backward compatibility (compatible with an LTE system)

and enables the relay node to receive control information from the eNode-B correctly and thereby achieves the purpose of obtaining frequency diversity gain. In addition, the TDM mode can realize power saving, and the FDM mode and the TDM-FDM mode also have the advantage of flexible service scheduling.

DETAILED DESCRIPTION

In order to make the objective, the technical solution and the advantages of the present invention clearly and better understood, the following embodiments are given in conjunction with the drawings for a further explanation of the present invention.

Embodiment 1

Figure 1:
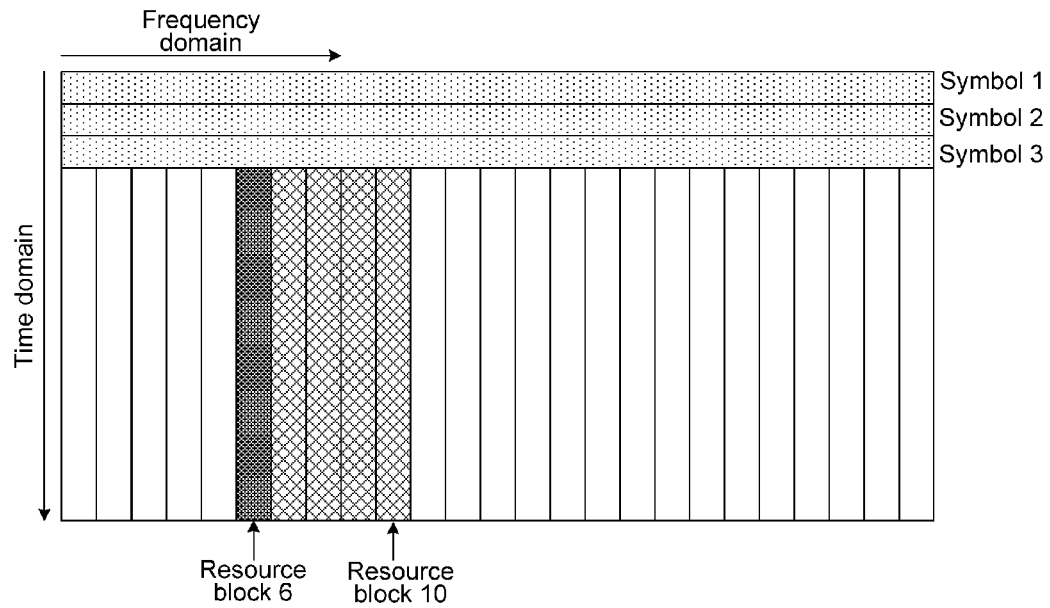
FIG. 1 is a schematic diagram illustrating the carrying of control information by continuous resource blocks and the universal set of OFDM symbols available to a relay link in a subframe according to Embodiment 1 of the present invention.

FIG. 1 is a schematic diagram illustrating the carrying of control information by centralized (continuous) resource blocks and the universal set of OFDM symbols available to a relay link in a subframe according to the present invention. Based on the frame structure shown in this figure, the first 1, 2 or 3 OFDM symbol(s) of a subframe can be used for carrying control information of a link from an eNode-B to a UE. In this embodiment, the first 3 OFDM symbols of a subframe, which are represented by shadow areas  in FIG. 1, are used for carrying control information of a link from an eNode-B to a UE. Control information of a link from the eNode-B to a relay node is carried by the sixth to the tenth resource blocks and the universal set of OFDM symbols available to a relay link in the subframe (here, the universal set of OFDM symbols available to a relay link refers to the fourth OFDM symbol to the last OFDM symbol of the current subframe); the eNode-B and the relay node make a calculation according to a cell identity (ID) in the system and the total quantity of resource blocks or according to the cell ID in the system and a subframe number, and then determine to carry the control information of the link from the eNode-B to the relay node and information on quantity and positions of other resource blocks for carrying control information of the link from the eNode-B to the relay node by the sixth resource block, wherein in this figure, the sixth resource block is represented by a shadow area , and said other resource blocks for carrying control information of the link from the eNode-B to the relay node refer to the seventh to the tenth resource blocks which are represented by shadow areas ; and service information of the link from the eNode-B to the UE and the link from the eNode-B to the relay node is carried by other resource blocks.

In this embodiment, an FDM mode is adopted to realize the carrying of control information of a link from an eNode-B to a relay node by continuous resource blocks and the universal set of OFDM symbols in a subframe available to a relay link; the use of the centralized resource blocks has no influence on a link from the eNode-B to a UE, therefore, this mode is advantaged in flexible scheduling.

Embodiment 2

Figure 2:
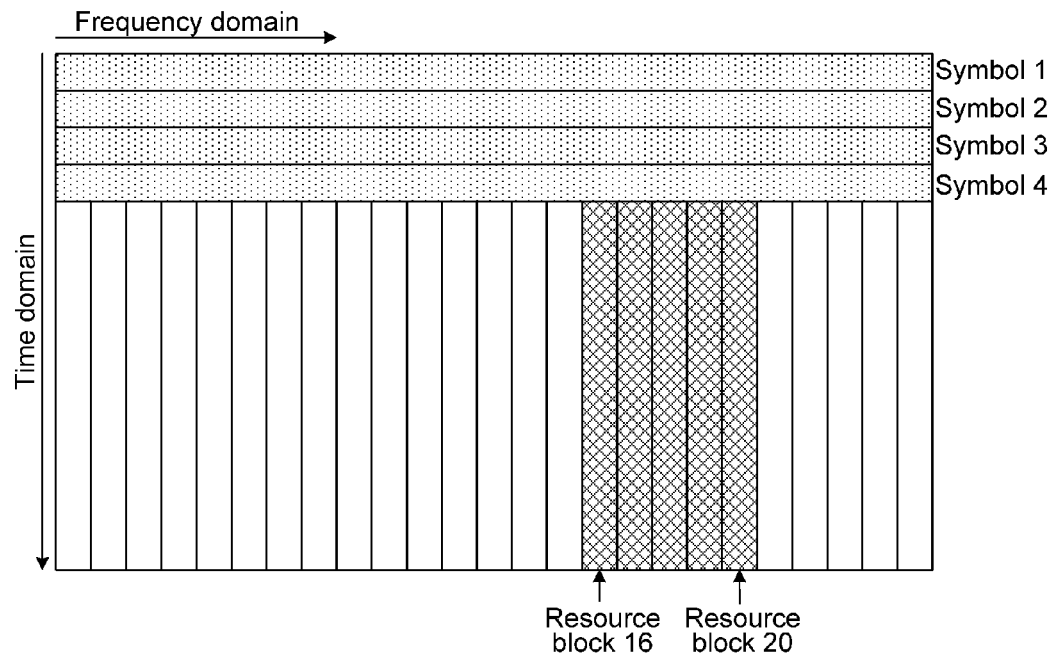
FIG. 2 is a schematic diagram illustrating the carrying of control information by continuous resource blocks and the universal set of OFDM symbols available to a relay link in a subframe according to Embodiment 2 of the present invention.

FIG. 2 is a schematic diagram illustrating the carrying of control information by centralized (continuous) resource blocks and the universal set of OFDM symbols in a subframe available to a relay link according to the present invention.

Based on the frame structure shown in this figure, the first 1, 2, 3 or 4 OFDM symbol(s) of a subframe can be used for carrying control information of a link from an eNode-B to a UE. In this embodiment, the first 4 OFDM symbols of a subframe, which are represented by shadow areas  in FIG. 2, are used for carrying control information of a link from an eNode-B to a UE; control information of a link from the eNode-B to a relay node is carried by the sixteenth to the twentieth resource blocks and the universal set of OFDM symbols in the subframe available to a relay link (here, the universal set of OFDM symbols available to a relay link refers to the fifth OFDM symbol to the last OFDM symbol of the current subframe); the eNode-B and the relay node make a calculation according to a cell ID in the system and the total quantity of resource blocks or according to the cell ID in the system and a subframe number, and then determine to carry control information of the link from the eNode-B to the relay node by the sixteenth to the twentieth resource blocks which are represented by shadow areas  in FIG. 2; and service information of the link from the eNode-B to the UE and the link from the eNode-B to the relay node is carried by other resource blocks.

In this embodiment, an FDM mode is adopted to realize the carrying of control information of a link from an eNode-B to a relay node by continuous resource blocks and the universal set of OFDM symbols in a subframe available to a relay link; the use of the centralized resource blocks has no influence on a link from the eNode-B to a UE, therefore, this mode is advantaged in flexible scheduling.

Embodiment 3

Figure 3:
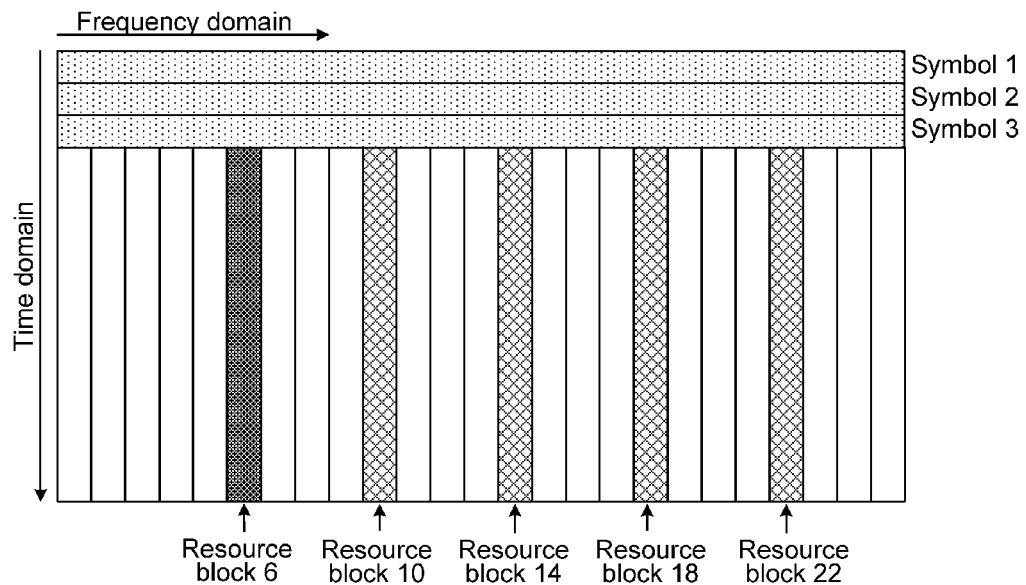
FIG. 3 is a schematic diagram illustrating the carrying of control information by discrete resource blocks and the universal set of OFDM symbols available to a relay link in a subframe according to Embodiment 3 of the present invention.

FIG. 3 is a schematic diagram illustrating the carrying of control information by distributed (discrete) resource blocks independent from a PCFICH and the universal set of OFDM symbols in a subframe available to a relay link according to the present invention. Based on the frame structure shown in this figure, the first 1, 2 or 3 OFDM symbol(s) of a subframe can be used for carrying control information of a link from an eNode-B to a UE. In this embodiment, the first 3 OFDM symbols of a subframe, which are represented by shadow areas ▨ in FIG. 3, are used for carrying control information of a link from an eNode-B to a UE; control information of a link from the eNode-B to a relay node is carried by the sixth, the tenth, the fourteenth, the eighteenth and the twenty-second resource blocks and the universal set of OFDM symbols in the subframe available to a relay link (here, the universal set of OFDM symbols available to a relay link refers to the fourth OFDM symbol to the last OFDM symbol of the current subframe); the eNode-B and the relay node make a calculation according to a cell ID in the system and the total quantity of resource blocks or according to the cell ID in the system and a subframe number, and then determine to carry control information of the link from the eNode-B to the relay node and information on quantity and positions of other resource blocks for carrying control information of the link from the eNode-B to the relay node by the sixth resource block, wherein in this figure, the sixth resource block is represented by a shadow area ▨, and said other resource blocks for carrying control information of the link from the eNode-B to the relay node refer to the tenth, the fourteenth, the eighteenth and the twenty-second resource blocks which are represented by shadow areas ▨ ; and service information of the link from the eNode-B to the UE and the link from the eNode-B to the relay node is carried by other resource blocks.

In this embodiment, an FDM mode is adopted to realize the carrying of control information of a link from an eNode-B to a relay node by discrete resource blocks and the universal set of OFDM symbols in a subframe available to a relay link; the use of the distributed resource blocks has no influence on a link from the eNode-B to a UE, therefore, this mode is advantaged in flexible scheduling and is capable of obtaining greater frequency diversity gain.

Embodiment 4

Figure 4:
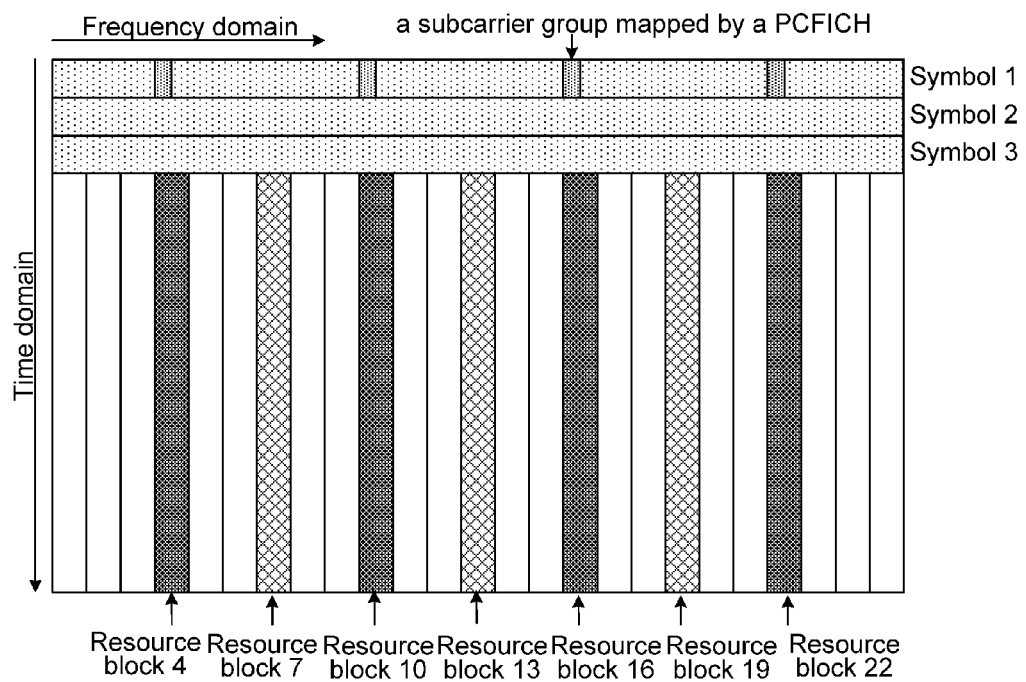
FIG. 4 is a schematic diagram illustrating the carrying of control information by discrete resource blocks and the universal set of OFDM symbols available to a relay link in a subframe according to Embodiment 4 of the present invention.

FIG. 4 is a schematic diagram illustrating the carrying of control information by distributed (discrete) resource blocks dependent on a PCFICH and the universal set of OFDM symbols in a subframe available to a relay link according to the present invention. Based on the frame structure shown in this figure, the first 1, 2 or 3 OFDM symbol(s) of a subframe can be used for carrying control information of a link from an eNode-B to a UE. In this embodiment, the first 3 OFDM symbols of a subframe, which are represented by shadow areas ▨ in this figure, are used for carrying control information of a link from an eNode-B to a UE; control information of a link from the eNode-B to a relay node is carried by the fourth, the seventh, the tenth, the thirteenth, the sixteenth, the nineteenth and the twenty-second resource blocks and the universal set of OFDM symbols in the subframe available to a relay link (here, the universal set of OFDM symbols available to a relay link refers to the fourth OFDM symbol to the last OFDM symbol of the current subframe); the eNode-B and the relay node agree on carrying control information of the link from the eNode-B to the relay node and information on quantity and positions of other resource blocks for carrying control information of the link from the eNode-B to the relay node by resource blocks corresponding to a subcarrier group mapped by a physical control format indicator channel (PCFICH), which are represented by shadow areas ▨ in FIG. 4, the resource blocks corresponding to a subcarrier group mapped by a PCFICH, which are represented by shadow areas ▨ in FIG. 4, refer to the fourth, the tenth, the sixteenth and the twenty-second resource blocks; and said other resource blocks for carrying control information of the link from the eNode-B to the relay node refer to the seventh, the thirteenth and the nineteenth resource blocks which are represented by shadow areas ▨ in FIG. 4; and service information of the link from the eNode-B to the UE and the link from the eNode-B to the relay node is carried by other blank resource blocks.

In this embodiment, an FDM mode is adopted to realize the carrying of control information of a link from an eNode-B to a relay node by discrete resource blocks and the universal set of OFDM symbols in a subframe available to a relay link; the use of the distributed resource blocks has no influence on a link from the eNode-B to a UE, therefore, this mode is advantaged in flexible scheduling and is capable of obtaining greater frequency diversity gain.

Embodiment 5

Figure 5:
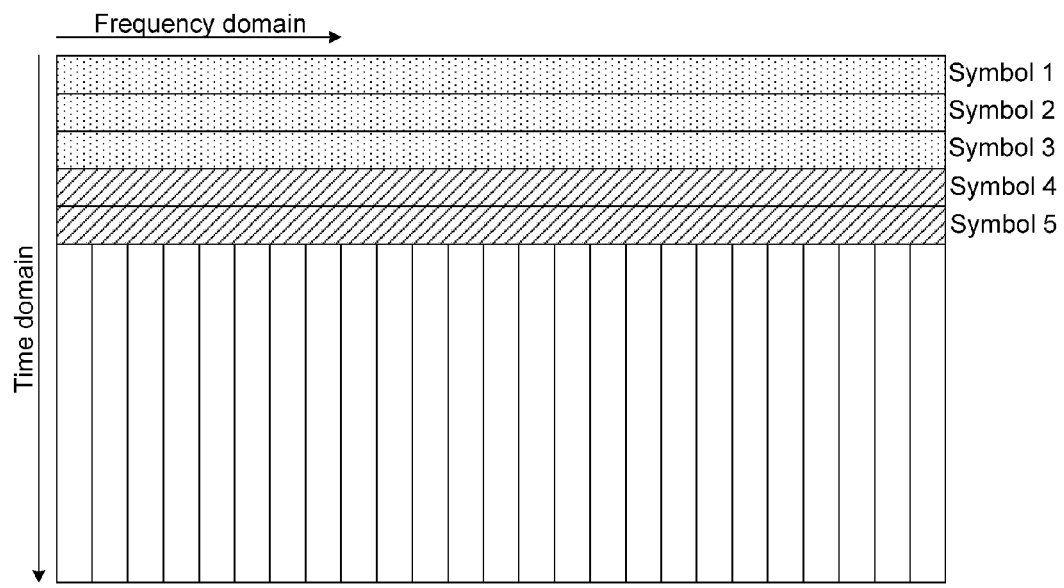
FIG. 5 is a schematic diagram illustrating the carrying of control information by all frequency resources according to Embodiment 5 of the present invention.

FIG. 5 is a schematic diagram illustrating the carrying of control information of a link from an eNode-B to a relay node by a subset of OFDM symbols available to a relay link, that is, by all the frequency resources according to the present invention (in this embodiment, the subset of OFDM symbols available to a relay link refers to the fourth OFDM symbol and/or fifth OFDM symbol). Based on the frame structure shown in this figure, the first 1, 2 or 3 OFDM symbol(s) of a subframe can be used for carrying control information of a link from the eNode-B to a UE, and all the frequency resources of the fourth OFDM symbol and/or the fifth OFDM symbol can be used for carrying control information of the link from the eNode-B to the relay node. In this embodiment, the first 3 OFDM symbols of a subframe, which are represented by shadow areas ▨ in FIG. 5, are used for carrying control information of the link from the eNode-B to the UE, and all the frequency resources of the fourth OFDM symbol and/or the fifth OFDM symbol represented by shadow areas ▨ in FIG. 5 are used for carrying control information of the link from the eNode-B to the relay node. And service information of the link from the eNode-B to the UE and the link from the eNode-B to the relay node is carried by other blank resource blocks.

In this embodiment, a TDM mode is adopted to realize the carrying of control information of a link from an eNode-B to a relay node by all the frequency resources of continuous OFDM symbols; due to the use of all frequency resources in TDM, the relay node monitors the content in a control channel and will stop receiving following OFDM symbols if there is no control information required by the relay node, therefore, the purpose of saving power is achieved.

Embodiment 6

Figure 6:
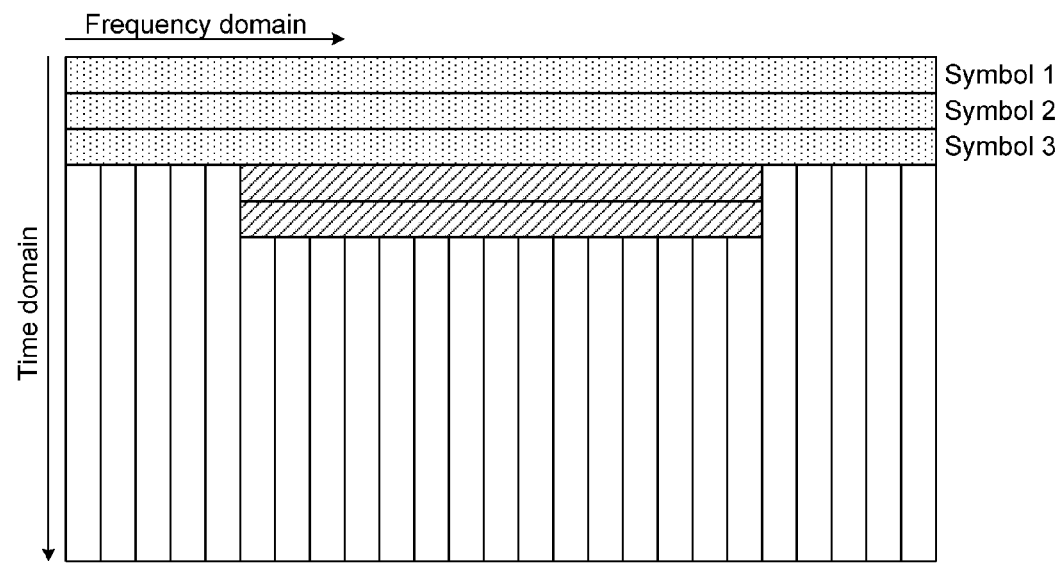
FIG. 6 is a schematic diagram illustrating the carrying of control information by continuous resource blocks and the universal set of OFDM symbols available to a relay link in a subframe according to Embodiment 6 of the present invention.

FIG. 6 is a schematic diagram illustrating the carrying of control information by centralized (continuous) resource blocks and a subset of OFDM symbols in a subframe available to a relay link according to the present invention. Based on the frame structure shown in this figure, the first 1, 2 or 3 OFDM symbol(s) of a subframe can be used for carrying control information of a link from an eNode-B to a UE, and centralized resource blocks of the fourth OFDM symbol and/or the fifth OFDM symbol can be used for carrying control information of a link from the eNode-B to a relay node. In this embodiment, the first 3 OFDM symbols of the subframe, which are represented by shadow areas  in FIG. 6, are used for carrying control information of the link from the eNode-B to the UE, and the centralized resource blocks of the fourth OFDM symbol and/or the fifth OFDM symbol (that is, the sixth to the twentieth resource blocks) and a subset of OFDM symbols available to a relay link (the subset here refers to the fourth OFDM symbol and/or fifth OFDM symbol) in the subframe, which are represented by shadow areas  in FIG. 6, are used for carrying control information of the link from the eNode-B to the relay node. And service information of the link from the eNode-B to the UE and the link from the eNode-B to the relay node is carried by other blank resource blocks.

In this embodiment, a TDM-FDM mode is adopted to realize the carrying of control information by continuous resource blocks in OFDM symbols; due to the use of centralized resource blocks in TDM, the relay node monitors the content in a control channel and will stop receiving following OFDM symbols when there is no control information required by the relay node, therefore, the purpose of saving power is achieved.

Embodiment 7

Figure 7:
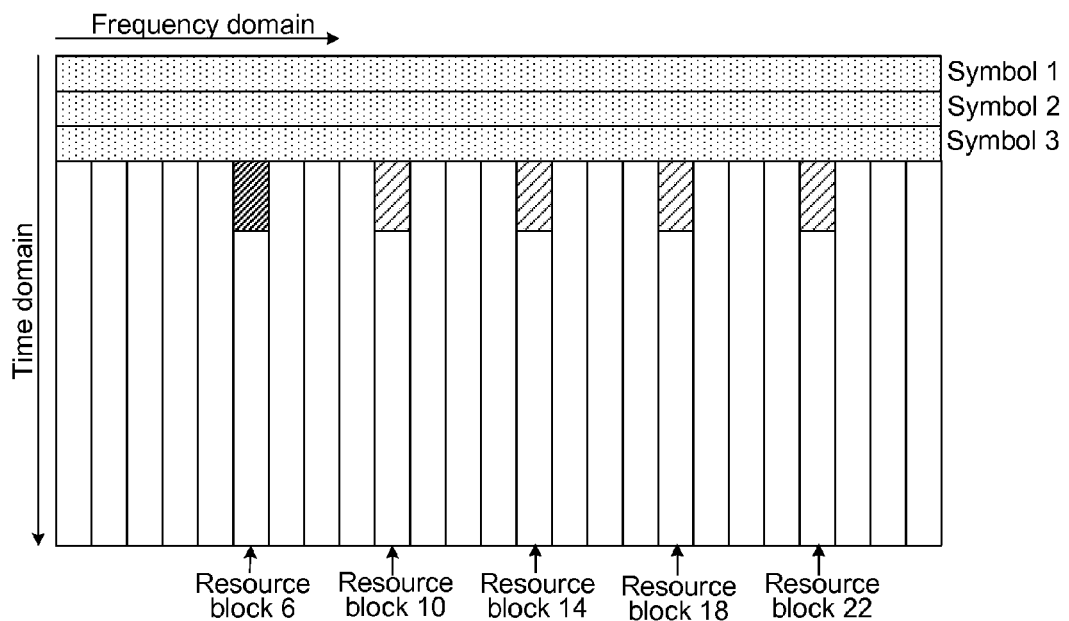
FIG. 7 is a schematic diagram illustrating the carrying of control information by discrete resource blocks independent from a PCFICH and a subset of OFDM symbols available to a relay link in a subframe according to Embodiment 7 of the present invention.

FIG. 7 is a schematic diagram illustrating the carrying of control information by distributed (discrete) resource blocks independent from a PCFICH and a subset of OFDM symbols in a subframe available to a relay link according to the present invention. Based on the frame structure shown in this figure, the first 1, 2 or 3 OFDM symbol(s) of a subframe, which are represented by shadow areas  in this figure, can be used for carrying control information of a link from an eNode-B to a UE, and distributed resource blocks of the fourth OFDM symbol and/or the fifth OFDM symbol (that is, the sixth, the tenth, the fourteenth, the eighteenth and the twenty-second resource blocks) and a subset of OFDM symbols in the subframe available to a relay link (the subset of OFDM symbols available to a relay link here refers to the fourth OFDM symbol and/or fifth OFDM symbol) can be used for carrying control information of a link from the eNode-B to a relay node. The eNode-B and the relay node make a calculation according to a cell ID in the system and the total quantity of resource blocks or according to the cell ID in the system and a subframe number, and then determine to carry control information of the link from the eNode-B to the relay node and information on quantity and positions of other resource blocks for carrying control information of the link from the eNode-B to the relay node by the sixth resource block, wherein in this figure, the sixth resource block is represented by a shadow area , and said other resource blocks refer to the tenth, the fourteenth, the eighteenth and the twenty-second resource blocks which are represented by shadow areas . And service information of the link from the eNode-B to the UE and the link from the eNode-B to the relay node is carried by other blank resource blocks.

In this embodiment, a TDM-FDM mode is adopted to realize the carrying of control information by discrete resource blocks in OFDM symbols; due to the use of distributed resource blocks in TDM, the relay node monitors the content in a control channel and will stop receiving following OFDM symbols when there is no control information required by the relay node, therefore, the purpose of saving power can be achieved and higher frequency diversity gain can be obtained.

Embodiment 8

Figure 8:
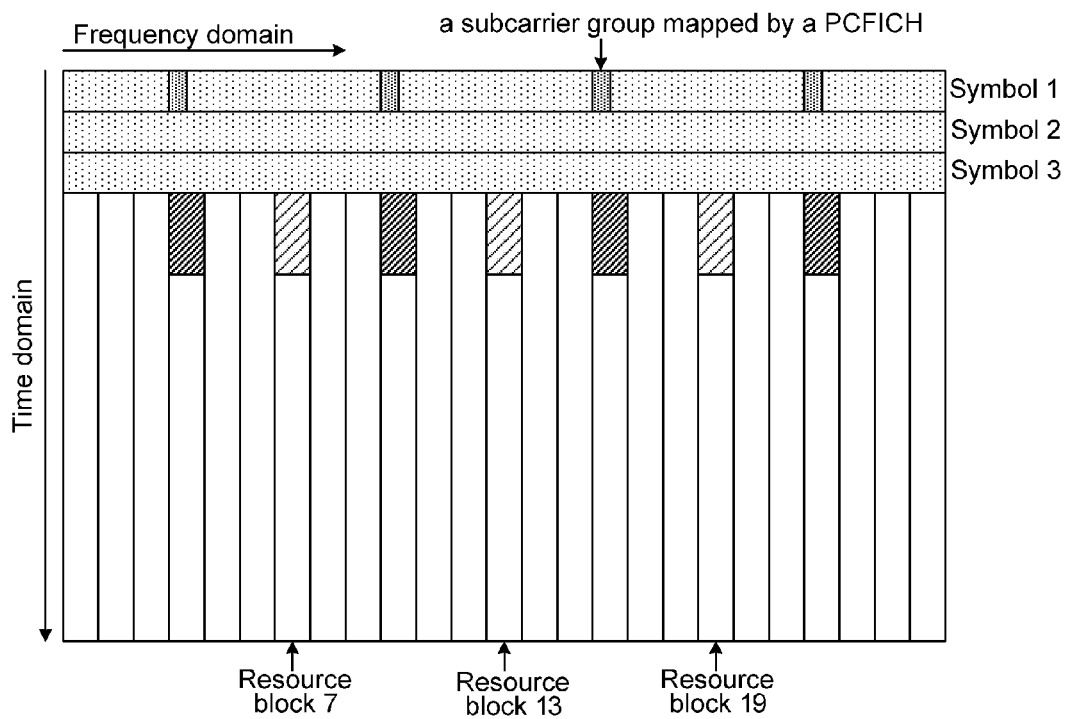
FIG. 8 is a schematic diagram illustrating the carrying of control information by discrete resource blocks dependent on a PCFICH and a subset of OFDM symbols available to a relay link in a subframe according to Embodiment 8 of the present invention.

FIG. 8 is a schematic diagram illustrating the carrying of control information by distributed (discrete) resource blocks dependent on a PCFICH and a subset of OFDM symbols in a subframe available to a relay link according to the present invention. Based on the frame structure shown in this figure, the first 1, 2 or 3 OFDM symbol(s) of a subframe, which are represented by shadow areas  in this figure, can be used for carrying control information of a link from an eNode-B to a UE; distributed resource blocks of the fourth OFDM symbol and/or the fifth OFDM symbol can be used for carrying control information of a link from the eNode-B to a relay node, the fourth, the seventh, the tenth, the thirteenth, the sixteenth, the nineteenth and the twenty-second resource blocks and a subset of OFDM symbols in the subframe available to a relay link (the subset of OFDM symbols available to a relay link here refers to the fourth OFDM symbol and/or fifth OFDM symbol) can be used for carrying control information of a link from the eNode-B to a relay node. The eNode-B and the relay node agree on carrying control information of the link from the eNode-B to the relay node and information on quantity and positions of other resource blocks for carrying control information of the link from the eNode-B to the relay node by resource blocks corresponding to a subcarrier group mapped by a physical control format indicator channel (PCFICH) wherein in this figure, the resource blocks corresponding to a subcarrier group mapped by a PCFICH are represented by shadow areas , and said other resource blocks for carrying control information of the link from the eNode-B to the relay node refer to the seventh, the thirteenth and the nineteenth resource blocks which are represented by shadow areas .

In this embodiment, a TDM-FDM mode is adopted to realize the carrying of control information by discrete resource blocks in OFDM symbols; due to the use of distributed resource blocks in TDM, the relay node monitors the content in a control channel and will stop receiving following OFDM symbols when there is no control information required by the relay node, therefore, the purpose of saving power can be achieved and higher frequency diversity gain can be obtained.

In the present invention, an eNode-B and a relay node determine quantity and positions of resource blocks that can be used for carrying control information of a link from the eNode-B to the relay node according to the cell ID in the system and the total quantity of resource blocks in the following specific exemplary way: for instance, if a cell ID is a 9-bit binary number '000111000' and the total number of downlink resource blocks is 50, then the eNode-B and the relay node calculate the result of the decimal number of the cell ID modulo '50', specifically, if, for instance, the decimal number of '000111000' is '56', then it can be determined that the position of a resource block for carrying control information of the link from the eNode-B to the relay node is mod (56, 50), that is, the sixth resource block can be determined as the one for carrying control information of the link from the eNode-B to the relay node and is then used for carrying control information of the link from the eNode-B to the relay node and information on the quantity and the positions of other resource blocks for carrying control information of the link from the eNode-B to the relay node.

In the present invention, an eNode-B and a relay node determine quantity and positions of resource blocks that can be used for carrying control information of a link from the eNode-B to the relay node according to the cell ID in the system and a subframe number in the following specific exemplary way: for instance, if a cell ID is a 9-bit binary number '000111000' and a subframe number is '10', then the eNode-B and the relay node calculate the result of the decimal number of the cell ID modulo '10', specifically, if, for instance, the decimal number of '000111000' is '56', then it can be determined that the position of a resource block for carrying control information of the link from the eNode-B to the relay node is mod (56, 10), that is, the sixth resource block can be determined as the one for carrying control information of the link from the eNode-B to the relay node and is then used for carrying control information of the link from the eNode-B to the relay node and information on quantity and positions of other resource blocks for carrying control information of the link from the eNode-B to the relay node.

In the present invention, control information of a link from an eNode-B to a relay node may include control information of one or more relay nodes as well as control information of relay node DL grant and UL grant, and/or control information of resources available to the relay node informed by the eNode-B, and/or control information of a UE to which the relay node belongs informed by the eNode-B. The relay node demodulates, when monitoring control information of its DL grant or UL grant, corresponding service information according to the control information; this relay node distributes, when monitoring control information of resources available to the relay node informed by the eNode-B, resources according to the control information; this relay node forwards, when monitoring control information of a UE to which the relay node belongs informed by the eNode-B, the control information to the corresponding UE.

Figure 9:
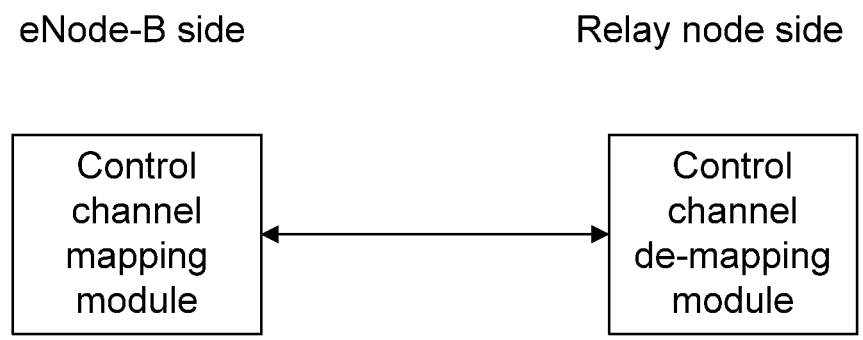
FIG. 9 is a schematic diagram illustrating the structure of a system for implementing a method for transmitting a relay link control channel according to the present invention.
Figure 10:
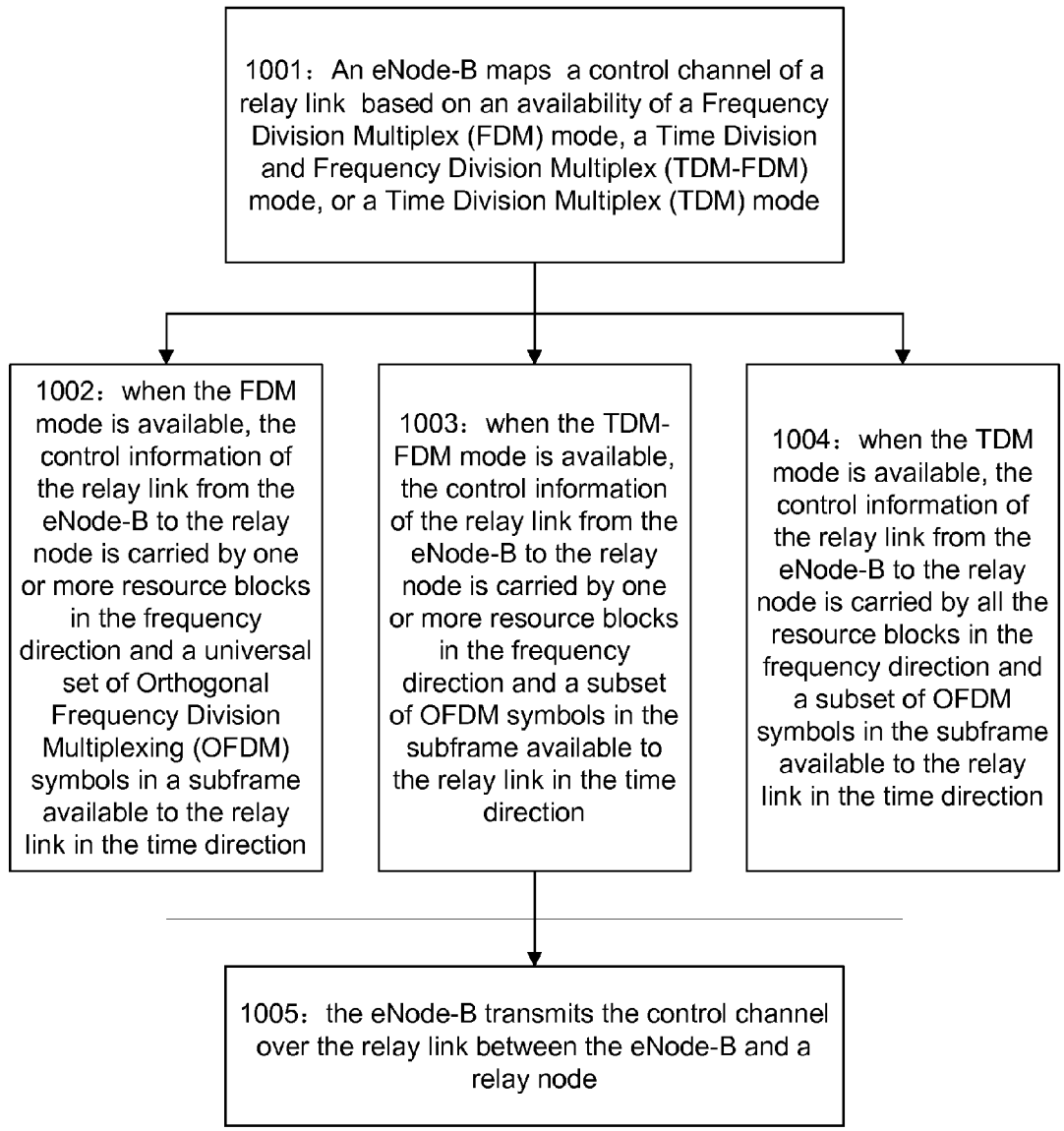
FIG. 10 is a schematic diagram illustrating a method for mapping a control channel of a relay link according to the present invention.
Figure 11:
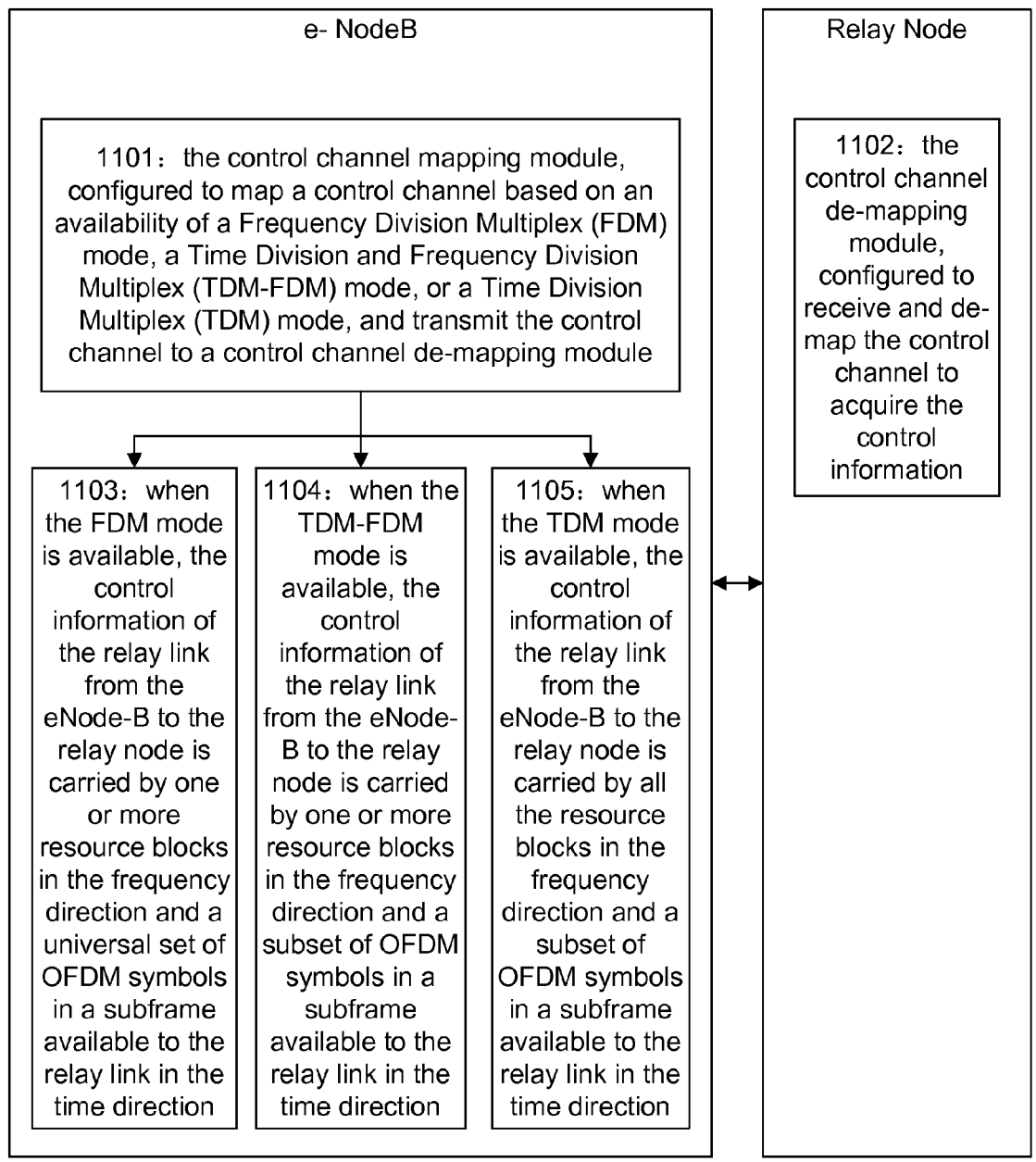
FIG. 11 is a schematic diagram illustrating a system for mapping a control channel of a relay link according to the present invention.

FIG. 9 is a structure diagram illustrating a system for implementing a method for transmitting a relay link control channel in the present invention, and the system comprises a control channel mapping module on an eNode-B side and a control channel de-mapping module on a relay node side.

The control channel mapping module is used for carrying control information and mapping a control channel through an FDM mode, a TDM mode or a TDM-FDM mode to transmit control information of a link from an eNode-B to a relay node to the control channel de-mapping module; and the control channel de-mapping module is used for receiving and de-mapping the control channel to acquire the control information. In the system, in the FDM mode and the TDM-FDM mode, an embodiment of mapping of a control channel in the time direction and/or the frequency direction is the same as the aforementioned one.

Embodiment 9

In the time direction, the starting position of OFDM symbols where an eNode-B sends control information of a link from the eNode-B to a relay node is depended on the number of downlink resource blocks, for instance, if there are 6 downlink resource blocks, then the starting position of the OFDM symbols where the eNode-B sends the control information of the link from the eNode-B to the relay node is at the fifth OFDM symbol, and the starting position of OFDM symbols where the relay node begins to receive the control information of the link from the eNode-B to the relay node is at the fifth OFDM symbol; for another instance, if there are 50 downlink resource blocks, then the starting position of OFDM symbols where the eNode-B sends the control information of the link from the eNode-B to the relay node is at the fourth OFDM symbol, and the starting position of OFDM symbols where the relay node begins to receive the control information of the link from the eNode-B to the relay node is at the fourth OFDM symbol.

Or in the time direction, if the starting position of OFDM symbols where an eNode-B sends control information of a link from the eNode-B to a relay node is not dependent on the number of downlink resource blocks, for instance, the starting position of OFDM symbols where the eNode-B sends the control information of the link from the eNode-B to the relay node is always at the fourth OFDM symbol, and the starting position of OFDM symbols where the relay node receives the control information of the link from the eNode-B to the relay node is always at the fourth OFDM symbol.

Or in the time direction, the starting position of OFDM symbols where an eNode-B sends control information of a link from the eNode-B to a relay node is configured in a signaling notification manner, and the starting position of OFDM symbols where the relay node begins to receive the control information of the link from the eNode-B to the relay node is acquired according to signaling configuration.

Preferably, the signaling can be broadcast signaling which is preferably carried by a physical broadcast channel of a relay link or a system message, or the signaling can be dedicated signaling which is preferably carried by radio resource control (RRC) signaling.

Of course, the present invention may have many other embodiments, various corresponding variations and modifications can be devised by those skilled in this art without departing from the spirit and scope of the present invention, but it should be appreciated that such variations and modifications belong to the protection scope of the claims appended herein.

What is claimed is:

1. A method for mapping a control channel of a relay link, said method comprising:

mapping, by an eNode-B, a control channel of a relay link based on an availability of a control channel through a Frequency Division Multiplex (FDM) mode, a Time Division and Frequency Division Multiplex (TDM-FDM) mode, or a Time Division Multiplex (TDM) mode;

transmitting, by the eNode-B, the control channel over the relay link between the eNode-B and a relay node; wherein when the FDM mode is available, the control information of the relay link from the eNode-B to the relay node is carried by one or more resource blocks in the frequency direction and a universal set of Orthogonal Frequency Division Multiplexing (OFDM) symbols in a subframe available to the relay link in the time direction;

when the TDM-FDM mode is available, the control information of the relay link from the eNode-B to the relay node is carried by one or more resource blocks in the frequency direction and a subset of OFDM symbols in the subframe available to the relay link in the time direction;

when the TDM mode is available, the control information of the relay link from the eNode-B to the relay node is carried by all the resource blocks in the frequency direction and a subset of OFDM symbols in the subframe available to the relay link in the time direction; and the mapping of the control channel comprises mapping in the time direction and/or the frequency direction.

2. The method according to claim 1, wherein when the FDM mode is available, the control information of the relay link from the eNode-B to the relay node is carried by continuous or discrete resource blocks and the universal set of OFDM symbols in the subframe available to the relay link.

3. The method according to claim 2, wherein the mapping of the control channel in the frequency direction is as follows:

the control information of the relay link from the eNode-B to the relay node is carried in a control information carrying manner corresponding to continuous resource blocks and the universal set of OFDM symbols in the subframe available to the relay link; in this carrying manner, the eNode-B and the relay node determine quantity and positions of resource blocks used for carrying the control information of the relay link from the eNode-B to the relay node according to a cell ID in the system and the total quantity of the resource blocks or according to the cell ID in the system and a subframe number, and the control information and information on quantity and positions of other resource blocks for carrying the control information of the relay link from the eNode-B to the relay node is carried by one or more of the determined resource blocks used for carrying the control information of the relay link from the eNode-B to the relay node;

or the control information of the relay link from the eNode-B to the relay node is carried in a control information carrying manner corresponding to discrete resource blocks and the universal set of OFDM symbols in the subframe available to the relay link; in this carrying manner, the eNode-B and the relay node determine quantity and positions of resource blocks used for carrying the control information of the relay link from the eNode-B to the relay node according to the cell ID in the system and the total quantity of the resource blocks or according to the cell ID in the system and a subframe number, and the control information and information on quantity and positions of other resource blocks for carrying the control information of the relay link from the eNode-B to the relay node is carried by ones corresponding to a subcarrier group mapped by a physical control format indicator channel (PCFICH) in the determined resource blocks used for carrying the control information of the relay link from the eNode-B to the relay node.

4. The method according to claim 1, wherein when the TDM-FDM mode is available, the control information of the relay link from the eNode-B to the relay node is carried by continuous or discrete resource blocks and a subset of OFDM symbols in the subframe available to the relay link.

5. The method according to claim 4, wherein the mapping of the control channel in the frequency direction is as follows:

the control information of the relay link from the eNode-B to the relay node is carried in a control information carrying manner corresponding to continuous resource blocks and a subset of OFDM symbols in the subframe available to the relay link; in this carrying manner, the eNode-B and the relay node determine quantity and positions of resource blocks used for carrying the control information of the relay link from the eNode-B to the relay node according to a cell ID in the system and the total quantity of the resource blocks or according to the cell ID in the system and a subframe number, and the control information and information on quantity and positions of other resource blocks for carrying the control information of the relay link from the eNode-B to the relay node is carried by one or more of the determined resource blocks used for carrying the control information of the relay link from the eNode-B to the relay node;

or the control information of the relay link from the eNode-B to the relay node is carried in a control information carrying manner corresponding to discrete resource blocks and a subset of OFDM symbols in the subframe available to the relay link; in this carrying manner, the eNode-B and the relay node determine quantity and positions of resource blocks used for carrying the control information of the relay link from the eNode-B to the relay node according to the cell ID in the system and the total quantity of the resource blocks or according to the cell ID in the system and a subframe number, and the control information and information on quantity and positions of other resource blocks for carrying the control information of the relay link from the eNode-B to the relay node is carried by ones corresponding to a subcarrier group mapped by a physical control format indicator channel (PCFICH) in the determined resource blocks used for carrying the control information of the relay link from the eNode-B to the relay node.

6. The method according to claim 5, wherein there are at least one OFDM symbol and at most four OFDM symbols for carrying the control information of the relay link from the eNode-B to the relay node.

7. The method according to claim 4, wherein there are at least one OFDM symbol and at most four OFDM symbols for carrying the control information of the relay link from the eNode-B to the relay node.

8. The method according to claim 1, wherein when the TDM mode is available, the control information of the relay link from the eNode-B to the relay node is carried by all the resource blocks in the frequency direction and a subset of OFDM symbols in the subframe available to the relay link in the time direction.

9. The method according to claim 8, wherein there are at least one OFDM symbol and at most four OFDM symbols for carrying the control information of the relay link from the eNode-B to the relay node.

10. The method according to claim 1, wherein in the time direction, the eNode-B sends the control information of the relay link from the eNode-B to the relay node starting from the fourth or the fifth OFDM symbol; if the number of downlink resource blocks is less than or equal to 10, starting from the fifth OFDM symbol, otherwise, starting from the fourth OFDM symbol;

the relay node receives the control information of the relay link from the eNode-B to the relay node starting from the fourth or fifth OFDM symbol; if the number of downlink resource blocks is less than or equal to 10, starting from the fifth OFDM symbol, otherwise, starting from the fourth OFDM symbol;

or in the time direction, the eNode-B always sends the control information of the relay link from the eNode-B to the relay node starting from the fourth or the fifth OFDM symbol, and the relay node always receives the control information of the relay link from the eNode-B to the relay node starting from the fourth or the fifth OFDM symbol;
or in the time direction, the starting position of OFDM symbols where the eNode-B sends the control information of the relay link from the eNode-B to the relay node is configured in a signaling notification manner, and the starting position of OFDM symbols where the relay node begins to receive the control information of the relay link from the eNode-B to the relay node is acquired according to signaling configuration.

11. The method according to claim 1, wherein the control information of the relay link from the eNode-B to the relay node comprises control information of one or more relay nodes;
the control information also comprises: control information of relay node DL grant and UL grant, and/or control information of resources available to the relay node informed by the eNode-B, and/or control information of a UE to which the relay node belongs informed by the eNode-B.

12. A system for mapping a control channel of a relay link, the system comprising an eNode-B and a relay node, wherein the eNode-B comprises a control channel mapping module implemented by a processor with software running thereon, and the relay node comprises a control channel de-mapping module implemented by another processor with software running thereon;
the control channel mapping module is configured to, map a control channel based on an availability of a Frequency Division Multiplex (FDM) mode, a Time Division and Frequency Division Multiplex (TDM-FDM) mode, or a Time Division Multiplex (TDM) mode, and transmit the control channel to a control channel de-mapping module; and
when the FDM mode is available, the control information of the relay link from the eNode-B to the relay node is carried by one or more resource blocks in the frequency direction and a universal set of OFDM symbols in a subframe available to the relay link in the time direction;
when the TDM-FDM mode is available, the control information of the relay link from the eNode-B to the relay node is carried by one or more resource blocks in the frequency direction and a subset of OFDM symbols in a subframe available to the relay link in the time direction;
when the TDM mode is available, the control information of the relay link from the eNode-B to the relay node is carried by all the resource blocks in the frequency direction and a subset of OFDM symbols in a subframe available to the relay link in the time direction;
the control channel de-mapping module is configured to receive and de-map the control channel to acquire the control information; and
the mapping of the control channel comprises mapping in the time direction and/or the frequency direction.

13. The system according to claim 12, wherein when the FDM mode is available, the control information of the relay link from the eNode-B to the relay node is carried by continuous or discrete resource blocks and the universal set of OFDM symbols in the subframe available to the relay link.

14. The system according to claim 13, wherein the mapping of the control channel in the frequency direction is as follows:
the control information of the relay link from the eNode-B to the relay node is carried in a control information carrying manner corresponding to continuous resource blocks and the universal set of OFDM symbols in the subframe available to the relay link; in this carrying manner, the eNode-B and the relay node determine quantity and positions of resource blocks used for carrying the control information of the relay link from the eNode-B to the relay node according to a cell ID in the system and the total quantity of the resource blocks or according to the cell ID in the system and a subframe number, and the control information and information on quantity and positions of other resource blocks for carrying the control information of the relay link from the eNode-B to the relay node is carried by one or more of the determined resource blocks used for carrying the control information of the relay link from the eNode-B to the relay node;
or the control information of the relay link from the eNode-B to the relay node is carried in a control information carrying manner corresponding to discrete resource blocks and the universal set of OFDM symbols in the subframe available to the relay link; in this carrying manner, the eNode-B and the relay node determine quantity and positions of resource blocks used for carrying the control information of the relay link from the eNode-B to the relay node according to the cell ID in the system and the total quantity of the resource blocks or according to the cell ID in the system and a subframe number, and the control information and information on quantity and positions of other resource blocks for carrying the control information of the relay link from the eNode-B to the relay node is carried by ones corresponding to a subcarrier group mapped by a physical control format indicator channel (PCFICH) in the determined resource blocks used for carrying the control information of the relay link from the eNode-B to the relay node.

15. The system according to claim 12, wherein when the TDM-FDM mode is available, the control information of the relay link from the eNode-B to the relay node is carried by continuous or discrete resource blocks and a subset of OFDM symbols in the subframe available to the relay link.

16. The system according to claim 15, wherein the mapping of the control channel in the frequency direction is as follows:
the control information of the relay link from the eNode-B to the relay node is carried in a control information carrying manner corresponding to continuous resource blocks and a subset of OFDM symbols in the subframe available to the relay link; in this carrying manner, the eNode-B and the relay node determine quantity and positions of resource blocks used for carrying the control information of the relay link from the eNode-B to the relay node according to a cell ID in the system and the total quantity of the resource blocks or according to the cell ID in the system and a subframe number, and the control information and information on quantity and positions of other resource blocks for carrying the control information of the relay link from the eNode-B to the relay node is carried by one or more of the determined resource blocks used for carrying the control information of the relay link from the eNode-B to the relay node;
the control information of the relay link from the eNode-B to the relay node is carried in a control information carrying manner corresponding to discrete resource blocks and a subset of OFDM symbols in the subframe available to the relay link; in this carrying manner, the eNode-B and the relay node determine quantity and positions of resource blocks used for carrying the control information of the relay link from the eNode-B to the relay node according to the cell ID in the system and the total quantity of the resource blocks or according to the cell ID in the system and a subframe number, and the control information and information on quantity and positions of other resource blocks for carrying the control information of the relay link from the eNode-B to the relay node is carried by ones corresponding to a subcarrier group mapped by a physical control format indicator channel (PCFICH) in the determined resource blocks used for carrying the control information of the relay link from the eNode-B to the relay node.

17. The system according to claim 16, wherein there are at least one OFDM symbol and at most four OFDM symbols for carrying the control information of the relay link from the eNode-B to the relay node.

18. The system according to claim 15, wherein there are at least one OFDM symbol and at most four OFDM symbols for carrying the control information of the relay link from the eNode-B to the relay node.

19. The system according to claim 12, wherein when the TDM mode is available, the control information of the relay link from the eNode-B to the relay node is carried by all the resource blocks in the frequency direction and a subset of OFDM symbols in the subframe available to the relay link in the time direction.

20. The system according to claim 19, wherein there are at least one OFDM symbol and at most four OFDM symbols for carrying the control information of the relay link from the eNode-B to the relay node.

21. The system according to claim 12, wherein in the time direction, the eNode-B sends the control information of the relay link from the eNode-B to the relay node starting from the fourth or the fifth OFDM symbol; if the number of downlink resource blocks is less than or equal to 10, starting from the fifth OFDM symbol, otherwise, starting from the fourth OFDM symbol;

the relay node receives the control information of the relay link from the eNode-B to the relay node starting from the fourth or fifth OFDM symbol; if the number of downlink resource blocks is less than or equal to 10, starting from the fifth OFDM symbol, otherwise, starting from the fourth OFDM symbol;

or in the time direction, the eNode-B always sends the control information of the relay link from the eNode-B to the relay node starting from the fourth or the fifth OFDM symbol, and the relay node always receives the control information of the relay link from the eNode-B to the relay node starting from the fourth or the fifth OFDM symbol;

or in the time direction, the starting position of OFDM symbols where the eNode-B sends the control information of the relay link from the eNode-B to the relay node is configured in a signaling notification manner, and the starting position of OFDM symbols where the relay node begins to receive the control information of the relay link from the eNode-B to the relay node is acquired according to signaling configuration.

* * * * *